(12) United States Patent
Brossard (10) Patent No.: US 10,482,647 B2
(45) Date of Patent: Nov. 19, 2019

(54) COMPUTER-IMPLEMENTED METHOD FOR SIMULATING A BODY TAKING A POSTURE

(71) Applicant: Dassault Systemes, Velizy Villacoublay (FR)

(72) Inventor: Mickaël Brossard, Vélizy-Villacoublay (FR)

(73) Assignee: Dassault Systemes, Velizy Villacoublay (FR)

(*) Notice: Subject to any disclaimer, the term of this patent is extended or adjusted under 35 U.S.C. 154(b) by 0 days.

(21) Appl. No.: 15/812,789

(22) Filed: Nov. 14, 2017

(65) Prior Publication Data

US 2018/0144533 A1    May 24, 2018

(30) Foreign Application Priority Data

Nov. 22, 2016   (EP) ..................................... 16306533

(51) Int. Cl.
  *G06T 13/40*   (2011.01)
  *G06T 19/20*   (2011.01)

(52) U.S. Cl.
  CPC ............. *G06T 13/40* (2013.01); *G06T 19/20* (2013.01); *G06T 2200/24* (2013.01); *G06T 2219/2016* (2013.01)

(58) Field of Classification Search
  CPC ..... G06T 13/40; G06T 19/20; G06T 2200/24; G06T 2219/2016; G06T 2207/30196;

(Continued)

(56) References Cited

U.S. PATENT DOCUMENTS 6,088,042 A   7/2000 Handleman et al.
6,191,798 B1  2/2001 Handelman et al.
(Continued)

OTHER PUBLICATIONS

European Search Report for Int'l Application No. 16306533.7, entitled "Computer-Implemented Method for Simulating a Body Taking a Posture," consisting of 8 pages, dated Apr. 27, 2017.

(Continued)

*Primary Examiner* — Xilin Guo
(74) *Attorney, Agent, or Firm* — Hamilton, Brook, Smith & Reynolds, P.C.

(57) ABSTRACT

Computer-implemented method, system, and apparatus simulate a human/animal body taking a posture. Implementation includes: a) providing a body model (AV), having a skeleton with plurality of bones (b0-b4) articulated by rotational joints (A-D) forming at least one kinematic chain; b) defining a starting position and a starting rotational state for each rotational joint of the skeleton, and a target point position (T), called effector (EF), of an active kinematic chain; c) for at least one rotational axis of each joint of the active kinematic chain, defining: an actuation order, a maximal fractional contribution to a target rotation, and a maximal rotation angle; and d) iteratively applying, to the joints of the active kinematic chain, taken in actuation order, rotations around rotational axes in order to approach the effector to a target position (T). Each rotation of a joint is bounded by corresponding maximal rotation angle or corresponding maximal fractional contribution to the target rotation minimizing the distance between the effector and its target position.

12 Claims, 4 Drawing Sheets

(58) Field of Classification Search
CPC ........... G06T 7/75; G06T 17/20; G06T 13/00; A61B 1/0055; A61B 5/4528
See application file for complete search history.

(56) References Cited

U.S. PATENT DOCUMENTS

| | | | |
|---|---|---|---|
| 6,400,368 | B1 | 6/2002 | Laperriere |
| 6,535,215 | B1 | 3/2003 | De Witt et al. |
| 6,738,065 | B1 | 5/2004 | Even-Zohar |
| 9,001,132 | B1 | 4/2015 | Wooley et al. |
| 10,319,135 | B2 | 6/2019 | Brossard |
| 2001/0019333 | A1* | 9/2001 | Sasaki ............... A63F 13/10 345/653 |
| 2005/0278157 | A1 | 12/2005 | Raschke |
| 2007/0200854 | A1 | 8/2007 | Gordon et al. |
| 2008/0309664 | A1 | 12/2008 | Zhou et al. |
| 2013/0141431 | A1* | 6/2013 | Kawakami ............ G06T 13/40 345/419 |
| 2016/0307354 | A1 | 10/2016 | Baur |
| 2016/0335790 | A1* | 11/2016 | Fleishman ......... G06K 9/00355 |
| 2016/0371871 | A1 | 12/2016 | Aguado |
| 2017/0169138 | A1 | 6/2017 | Lemieux et al. |
| 2017/0221250 | A1 | 8/2017 | Aguado et al. |
| 2018/0144532 | A1 | 5/2018 | Brossard |

OTHER PUBLICATIONS

European Search Report for EP Application No. 16306532.9, entitled "Computer-Implemented Method for Simulating a Body Taking a Posture, In Particular to Look at a Target, In Particular to Look at a Target" dated: May 8, 2017.

Petsch, S., et al., "Estimation of Inverse Kinematics of Arbitrary Serial Chain Manipulators and Human-Like Robotic-Hands", 2013 IEEE, ASME International Conference on Advanced Intelligent Mechatronics (AIM), Wollongong, Australia, Jul. 9-12, 2013.

Autodesk, "Joint", published in 2017 downloaded from Internet Feb. 1, 2019 http://help.autodesk.com/cloudhelp/2017/ENU/Maya/files/GUID-8CE29E9D-F1Cd-42A3-A657-33E32887380A.

Badler, N.I., et al., "Articulate Figure Positioning by Multiple Constraints" IEEE Computer Graphics and Applications (vol. 7, Issue: 6 , Jun. 1987).

Matsemann, Blender, "Set resting length for a generic spring constraint", published Jan. 28, 2015, retrieved from Internet on Feb. 1, 2019 https://blender.stackexchange.com/questions/23925/set-resting-length-for-a-generic-spring-constraint.

Cheng, FT., et al. "Resolving manipulator redundancy under inequality constraints", IEEE Transactions on Robotics and Automation (vol. 10 , Issue: 1 , Feb. 1994).

Huang, J., et al., "Inverse kinematics using dynamic joint parameters: inverse kinematics animation synthesis learnt from subdivided motion micro-segments", The Visual Computer, vol. 33, Issue 12, pp. 1541-1553, Dec. 2017.

Ersu, E., et al., "A Numerical Solution of the General Kinematic Problem", Proceedings. 1984 IEEE International Conference on Robotics and Automation, Mar. 13-15, 1984.

Autodesk Maya 2017 Help Manual, "Understanding the Attrivbutes of a Joint." Published in 2017.

* cited by examiner

COMPUTER-IMPLEMENTED METHOD FOR SIMULATING A BODY TAKING A POSTURE

RELATED APPLICATION

This application claims priority under 35 U.S.C. § 119 or 365 to European Application No. 16306533.7, filed Nov. 22, 2016. The entire teachings of the above application are incorporated herein by reference.

FIELD OF INVENTION

The invention relates to a computer-implemented method for simulating the motion of a human being (or animal) taking a posture. It relates to the field of computer graphics and it lends itself to several applications such as Computer Aided Design (CAD), ergonomics, video games, etc.

BACKGROUND

It is known to represent human or animal bodies by digital models comprising a "skeleton" covered by a "skin". The skeleton is constituted by a set of segments, called "bones" even if they do not necessarily correspond to actual anatomical bones, articulated by rotational joints having one, two or three rotational degrees of freedom. Such models, also known as "avatars", are usually provided in standard postures, such as the so-called "T-pose" (partially spread legs, arms extended horizontally) for human body models.

In order to make the avatar take a particular posture different from the original one, it is necessary to determine a set of rotations of the joints articulating the bones of its skeleton leading to the desired result. This is not an easy task.

In many cases, instead of fully specifying the desired posture, one only imposes a constraint on one or more particular points (called "effectors") of the skeleton. For instance, one may impose that a hand of the avatar (e.g. corresponding to the endpoint of a bone representing its forearm) takes a particular position. From a theoretical standpoint, this corresponds to the problem of inverse kinematics (IK).

While direct kinematics allows computing the position X of one or more effectors of a kinematic chain (such as a skeleton or a portion thereof) as a function of a set of parameters θ defining the rotation angles of the joints of the chain:

$$X = f(\theta)$$

inverse kinematics aims at computing the parameters θ leading to a specified target position X of the effector:

$$\theta = f^{-1}(X).$$

While a direct kinematics problem usually allows a single solution, an inverse kinematics problem may have zero or infinite solution. In the first case, the target position X is impossible to reach; in the second one (under-constrained system), it corresponds to an infinite number of different postures (redundancy) defining a "solution space", one of which has to be sort out arbitrarily or based on some criteria.

The inverse kinematics problem only allows an analytical solution for very short kinematic chains, which are usually of little practical interest.

In more complex cases, one may locally linearize the direct kinematic function f, and invert it. In fact, if the system is under-constrained, only a pseudo-inverse of the (linearized) direct kinematic function may be found, and redundancy is dealt with by choosing the solution which minimizes a suitably chosen cost function. This method is very powerful and flexible—indeed, much more than required by many computer graphic applications—but it involves complex calculations which are incompatible with real-time implementations.

Other approaches exist to solve the inverse kinematic problem in a faster and more practical way.

A well known approach consists in reducing the inverse kinematic problem to a minimization problem—the function to be minimized being the distance between the effector and the target position—and solving the latter using the Cyclic Coordinate Descent (CCD) algorithm (see David G. Luenberger and Yinyu Ye "Linear and Nonlinear Programming" third edition, Springer (2008)). Cyclic Coordinate Descent Inverse Kinematics (CCD-IK) is actually an iterative algorithm that performs local adjustments to the joints to minimize errors of position and orientation of the effectors. Each iteration goes through the kinematic chain from the extremity to the root and modifies each joint individually. This adaptation is then simple enough to be performed analytically.

The main advantage of this method is the absence of singularities during its convergence. However, it also has a few major disadvantages. First of all, it does not provide the space of possible solutions taking account of redundancy, but only a single solution, which may not correspond to a realistic posture of a human or animal body. Finally, the adaptation is not evenly distributed between the joints. Indeed, the first joint to be modified undergo the largest rotation—which are often much too large to lead to a realistic posture. This approach is well suited to robotics, where only the final position of the effector counts, rather than the posture itself.

The Inductive Inverse Kinematic Algorithm (J. O. Kim et al. "The Inductive Inverse Kinematics Algorithm to Manipulate the Posture of an Articulated Body", ICCS 2003) is a modified form of CCD leading to more realistic postures. To do so, it initializes the kinematic chain in a precomputed posture stored in a so-called "Unified Postures Map" before launching the CCD algorithm. The drawback of this approach is that it requires storing a great number of precomputed postures for a single kinematic chain. Applying it to the modeling of human or animal body would require computing Unified Posture Maps for several different skeletons (e.g. corresponding to different individuals), each comprising a plurality of kinematic chains, further increasing the burden which quickly becomes unbearable.

The Triangulation Inverse Kinematics algorithm (R. Müller-Cajar and R. Mukundan "Triangulation: A new algorithm for Inverse Kinematics, Proceedings of Image and Vision Computing New Zealand 2007) has been introduced following the acknowledgement that CCD-based methods give unrealistic postures mainly because the first parameters to be adapted undergo the biggest changes. "Triangulation" reduces this drawback by determining the rotation of each joint towards the target by a law of cosines. The algorithm is easy and fast to implement, but it does not lead to sufficiently realistic postures.

SUMMARY

The invention aims at overcoming the drawbacks of the prior art. More precisely it aims at providing a simple and fast (compatible with real-time requirements) method for simulating a human or animal body taking a posture, leading to realistic—albeit not necessarily anatomically accurate—results.

An object of the present invention, allowing achieving this aim, is a computer-implemented method for simulating a human or animal body taking a posture, comprising the steps of:

a) providing a model of said human or animal body, including a skeleton comprising a plurality of bones articulated by rotational joints to form at least one kinematic chain, each rotational joint connecting two bones and having a number of rotational axes comprised between one and three;

b) defining a starting position and a starting rotational state for each rotational joint of the skeleton, and a target position for a point, called effector, of a kinematic chain, called active kinematic chain;

c) for at least one rotational axis of each one of a plurality of joints of the active kinematic chain, defining:
  an actuation order;
  a maximal fractional contribution to a target rotation; and
  a maximal rotation angle; and d) iteratively applying, to the joints of the active kinematic chain, taken in their actuation order, rotations around their rotational axes in order to approach the effector to its target position, wherein each rotation of a joint about a rotational axis is bounded by one among the corresponding maximal rotation angle and of the corresponding maximal fractional contribution to the target rotation which would minimize the distance between the effector and its target position.

Another object of the invention is a computer program product, stored on a non-transitory computer-readable data-storage medium, comprising computer-executable instructions to cause a computer system to carry out such a method.

Yet another object of the invention is a non-transitory computer-readable data-storage medium containing computer-executable instructions to cause a computer system to carry out such a method.

A further object of the invention is a computer system comprising a processor coupled to a memory and a graphical user interface, the memory storing computer-executable instructions to cause the computer system to carry out such a method.

Another object of the invention is a model of a human or animal body taking a posture simulated with such a method.

Additional features and advantages of the present invention will become apparent from the subsequent description, taken in conjunction with the accompanying drawings, wherein:

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Figure 1:
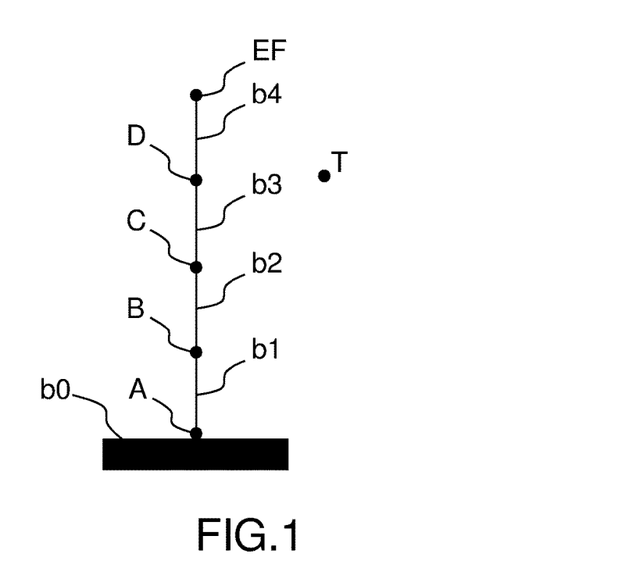
FIGS. 1, 2A, 2B, 3A, 3B, 4A and 4B illustrate the sequence of rotations applied to a kinematic chain of a skeleton in order to move an effector towards a target according to an exemplary embodiment of the inventive method.

The invention will be described with reference to a very simple example, illustrated on FIG. 1: a kinematic chain consisting of four bones $b1$, $b2$, $b3$, $b4$, a fixed base $b0$ (which can be considered to be a bone) and four rotational joints A, B, C, D each having a single rotational axis. The rotational axes are parallel to each other; therefore the movement of the chain is constrained in a plane. The effector EF is the endpoint of the bone $b4$, the farthest from the base $b0$. The generalization to a more complex—and three-dimensional—case is straightforward. FIG. 1 represents the kinematic chain in an initial posture, wherein all the joints have a 0° initial rotational angle, and all the bones are aligned.

The inventive method comprises two phases. The first one, which is always carried out, converges to a realistic posture in which the position of the effector EF may not coincide exactly to the target point T. The second one, which is optional, modifies this posture to ensure that the effector reaches the target.

Before using the inventive algorithm, it is necessary to create a simple data structure: an ordered list of elements, each element comprising:
  an identifier of a joint and of a rotational axis thereof;
  a numerical value indicative of the maximal fractional contribution of the joint to a target rotation; and
  a numerical value indicative of the maximal rotation angle of the joint.

The table 1 below provides an example of such a list; however, there are no identifiers of the rotational axes of the joints as only one degree-of-freedom joints are considered in the example of FIG. 1:

TABLE 1

| Joint | Max. fractional contribution | Max. rotation angle |
|---|---|---|
| B | 30% | 20° |
| A | 30% | 60° |
| D | 100% | 20° |
| ... | ... | ... |

The first phase of the algorithm is carried out iteratively and bears some resemblance with the CCD algorithm. However, the "maximal fractional contribution" and "maximal rotation angle" defined for each rotational axis ensure a more balanced—and freely tailored by the user—distribution of the joint rotations.

Figure 2A:
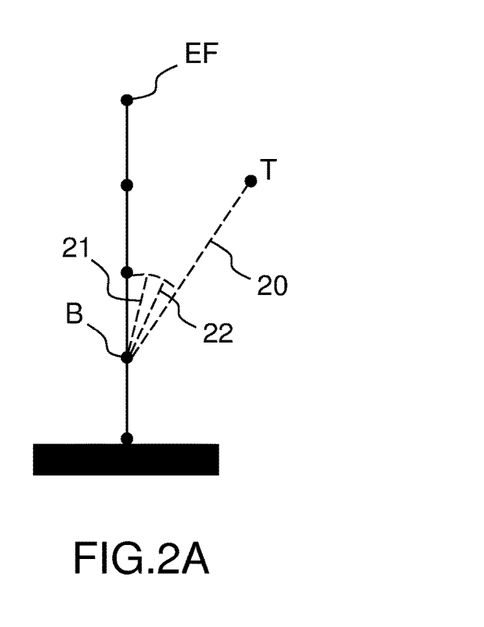
Figure 2B:
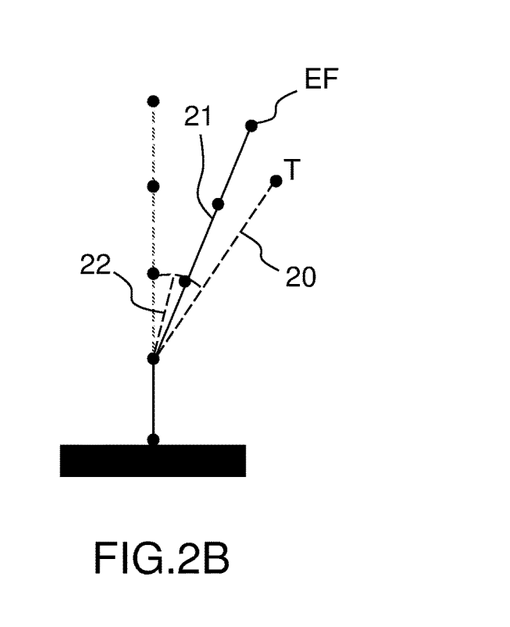

The first element of the list corresponds to joint B. The first step of the first phase consists then in rotating this joint in order to move the effector EF towards the target T. On FIG. 2A, dashed line 20 represents the configuration that the sub-chain $b2$-$b3$-$b4$ would take if joint B was rotated in order to truly minimize the EF-T distance. However, the list shows that joint B is characterized by a maximal fractional contribution of 30% and a maximal rotation angle of 20°. This means that the actual rotation of the joint is limited to either 30% of the "full" rotation (see dashed line 21) or to a rotation of 20° (see dashed line 22). The larger of the two bounds is chosen—in this case, the 20° rotation. The resulting configuration ("posture") is shown on FIG. 2B.

Figure 3A:
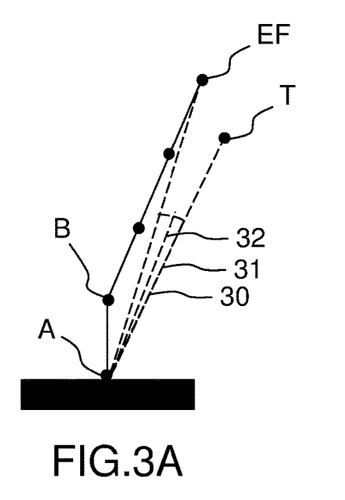
Figure 3B:
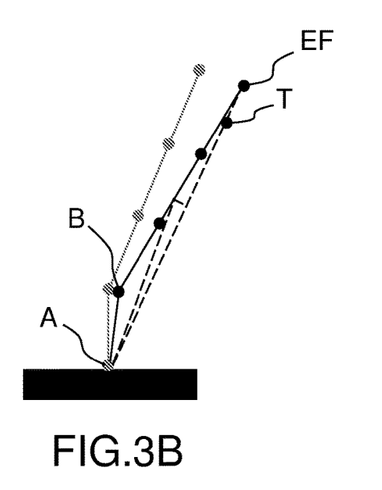

The following node to be actuated is A. On FIG. 3A, line 30 shows the posture corresponding to the "full" rotation and line 31 that corresponding to a rotation bounded by the maximal fractional contribution of 30%. Line 32 should, in principle, correspond to the maximum rotation angle i.e. 60°, but this would exceed the "full" rotation, which is not allowed as it would move the effector past the target. Therefore line 32 is aligned with line 30, and determines the actual rotation of joint A (FIG. 3B).

Figure 4A:
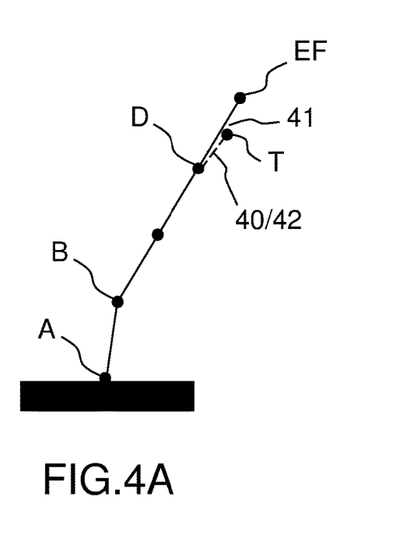
Figure 4B:
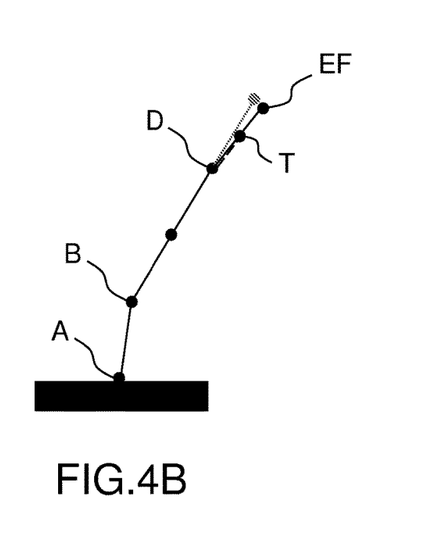

The third node to be actuated is D. The situation illustrated on FIG. 4A is similar to that of the preceding step; line 40 corresponds to the full rotation, line 41 to the maximal fractional contribution and line 42, coincident with line 40, the maximal rotation angle bounded by the full rotation. FIG. 4B shows the pose obtained after this third step.

In this exemplary embodiment of the invention, the first phase of the algorithm ends here. In more complex embodiments, joint C could also be actuated and/or several iterations could be performed, i.e. the joints of the list could be processed several times.

It can be seen on FIG. 4B that, at the end of this first step, the effector has not reached the target. Further iterating the step would not solve this problem. Therefore, in order to make the effector coincide to the target, a second step is carried out using the conventional CCD algorithm. As CCD only has to provide a comparatively small refinement, it will not "spoil" the realistic appearance of the posture generated by the first step.

It can be understood that a key advantage of the inventive method over e.g. Triangulation is its tunability: the user can freely change the order of the joints of the list, as well as the numerical values of the maximum fractional contribution and of the maximum rotation angle for each said joint. The computation of a pose being very fast, the user can easily try different settings in order to find the most realistic posture.

Until now, only the case of an "abstract" kinematic chain has been considered. In actual implementations of the method, the kinematic chain will represent a part of a skeleton corresponding e.g. to a limb such as an arm. In general, a skeleton will be considered as being composed of a plurality of kinematic chains. The inventive method allows acting on a single, "active" chain, while the other are considered fixed. When the method is applied to an avatar, moreover, it may be necessary to impose additional constraints to the rotations of the joints, reflecting a physiological constraint of the modeled human or animal body.

Figure 5A:
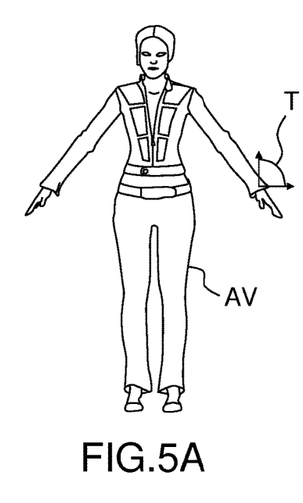
FIGS. 5A-5C show an exemplary application of the inventive method.
Figure 5B:
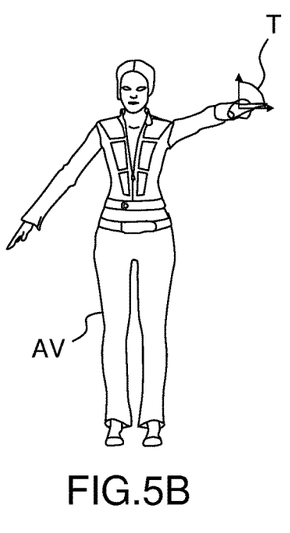
Figure 5C:
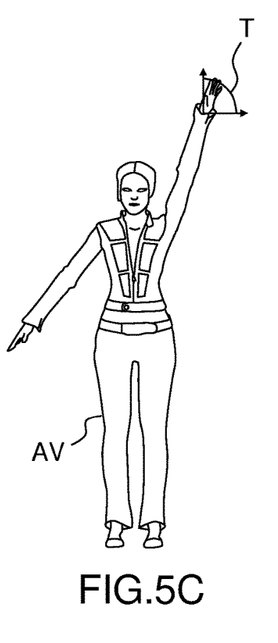

FIGS. 5A-5C shows an avatar AV having a skeleton (non represented) comprising a plurality of kinematic chains. The chain representing the left arm (to the right of each figure) is the "active" one, and its effector corresponds to the right wrist; the rest of the body constitutes a fixed base. The target T consists of a cursor which is moved by a user, using e.g. a mouse, in a three-dimensional scene containing the avatar. As it can be seen, repeatedly carrying out the inventive method for successive positions of the target allows the effector to follow it in real time, and the posture of the avatar always looks very natural.

It is important to note that, while the final posture is realistic, the movements performed by the kinematic chain to reach it are not necessarily so, except for small displacements. Therefore, it the inventive method is used to perform an animation, it is advised to start with a target point situated near to the effector and to move it gradually toward it final position.

It is not necessary that the effector corresponds to an extremity of a limb. For instance, it could be possible to fix the position of the hand of the avatar (i.e. to take the hand as the base) and to consider that the shoulder, or the center of the body, is the effector.

Until now, only the case wherein the larger of the maximal rotation angle and of the corresponding maximal fractional contribution to the target rotation is chosen to bound the rotation of the joint. This choice accelerates the convergence. However, the opposite choice (i.e. the smaller of the maximal rotation angle and of the corresponding maximal fractional contribution to the target rotation) is also possible. It is also possible to adopt an "hybrid" approach, e.g. to choose the larger bound for the first iteration(s) and the smaller one for the last one(s).

The inventive method can be performed by a suitably-programmed general-purpose computer or computer system, possibly including a computer network, storing a suitable program in non-transitory form on a computer-readable medium such as a hard disk, a solid state disk or a CD-ROM and executing said program using its microprocessor(s) and memory.

Figure 6:
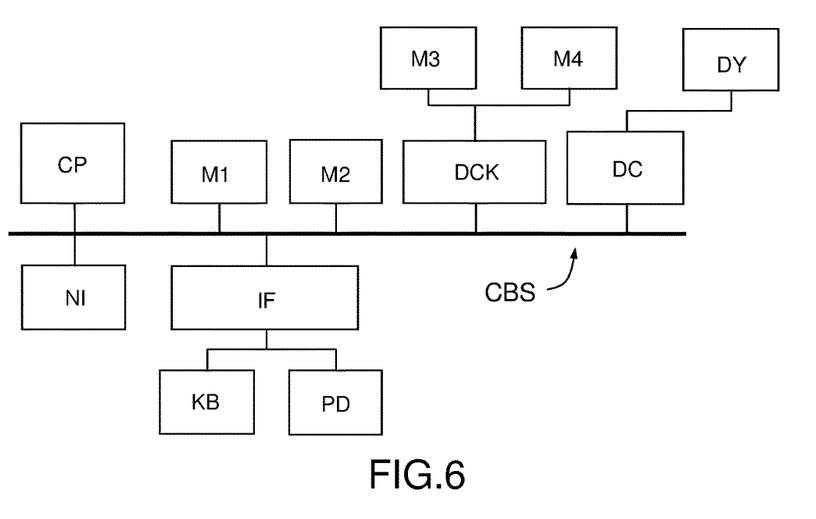
FIGS. 6 and 7 are block diagrams of respective computer systems suitable for carrying out a method according to different embodiments of the invention.

A computer suitable for carrying out a method according to an exemplary embodiment of the present invention is described with reference to FIG. 6. In FIG. 6, the computer includes a Central Processing Unit CPU which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. Moreover, one or more computer files defining the digital model (avatar) of at least one human or animal body and/or a three-dimensional scene in which said model in immersed may also be stored on one or more of memory devices M1 to M4, or remotely.

The claimed invention is not limited by the form of the computer-readable media on which the computer-readable instructions and/or the digital files of the inventive process are stored. For example, the instructions and files can be stored on CDs, DVDs, in FLASH memory, RAM, ROM, PROM, EPROM, EEPROM, hard disk or any other information processing device with which the Computer Aided Design or illustration authoring station communicates, such as a server or computer. The program and the files can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 8, UNIX, Solaris, LINUX, Apple MAC-OS and other systems known to those skilled in the art.

The Central Processing Unit CPU can be a Xenon processor from Intel of America or an Opteron processor from AMD of America, or can be other processor types, such as a Freescale ColdFire, IMX, or ARM processor from Freescale Corporation of America. Alternatively, the Central Processing Unit can be a processor such as a Core2 Duo from Intel Corporation of America, or can be implemented on an FPGA, ASIC, PLD or using discrete logic circuits, as one of ordinary skill in the art would recognize. Further, the Central Processing Unit can be implemented as multiple processors cooperatively working to perform the computer-readable instructions of the inventive processes described above.

The computer in FIG. 6 also includes a network interface NI, such as an Intel Ethernet PRO network interface card from Intel Corporation of America, for interfacing with a network, such as a local area network (LAN), wide area network (WAN), the Internet and the like. The Computer Aided Design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface, used by the user to provide input commands—e.g. to move the pointer tool, define the value of a parameter . . . —and by the Computer Aided Design station for displaying the three-dimensional scene including the avatar.

Disk controller DKC connects HDD M3 and DVD/CD M4 with communication bus CBS, which can be an ISA, EISA, VESA, PCI, or similar, for interconnecting all of the components of the Computer Aided Design station.

A description of the general features and functionality of the display, keyboard, pointing device, as well as the display controller, disk controller, network interface and I/O interface is omitted herein for brevity as these features are known.

Figure 7:
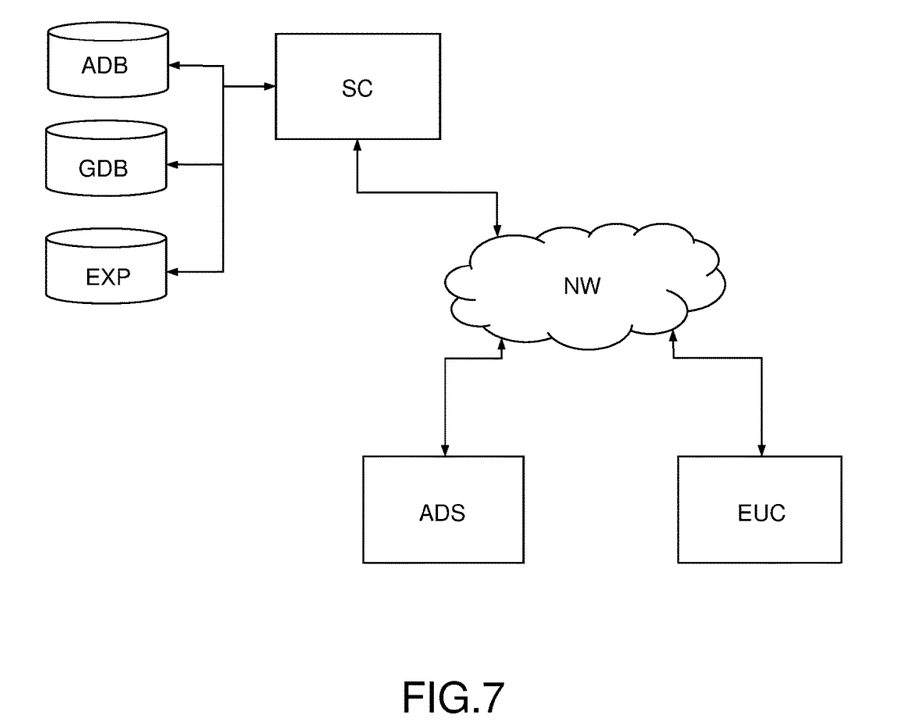

FIG. 7 is a block diagram of a computer system suitable for carrying out a method according to a different exemplary embodiment of the present invention.

In FIG. 7, the executable program EXP and the computer file(s) defining the avatar(s) and possibly the three-dimensional scene are stored on memory devices connected to a server SC. The memory devices and the overall architecture of the server may be the same as discussed above with reference to FIG. 6, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 6, except that the memory devices of the administrator system and the end user computer do not store the executable program EXP and/or the computer file(s) defining the avatar and/or the three-dimensional scene. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database DB stored by the server SC and containing files defining three-dimensional scenes, avatars or elements thereof. The server performs the processing as described above, and transmits to the end user computer an image file corresponding to the desired representation of the scene, again using the network NW.

Although only one administrator system ADS and one end user system EUX are shown, the system can support any number of administrator systems and/or end user systems without limitation. Similarly, multiple servers can also be implemented in the system without departing from the scope of the present invention Any processes described herein should be understood as representing modules, segments, or portions of code which include one or more executable instructions for implementing specific logical functions or steps in the process, and alternate implementations are included within the scope of the exemplary embodiment of the present invention.

While example embodiments have been particularly shown and described, it will be understood by those skilled in the art that various changes in form and details may be made therein without departing from the scope of the embodiments encompassed by the appended claims.

What is claimed is:

1. A computer-implemented method for simulating a human or animal body taking a posture, comprising the steps of:
   a) providing in computer memory a model of said human or animal body, including a skeleton comprising a plurality of bones articulated by rotational joints to form at least one kinematic chain, each rotational joint connecting two bones and having a number of rotational axes comprised between one and three;
   b) defining a starting position and a starting rotational state for each rotational joint of the skeleton, and a target position for a point, called effector, of a kinematic chain, called active kinematic chain;
   c) for at least one rotational axis of each one of a plurality of rotational joints of the active kinematic chain, defining:
      an actuation order;
      a maximal fractional rotation contribution about the axis to a target rotation; and
      a maximal rotation angle about the axis; and
   d) automatically by a processor, iteratively applying, to the rotational joints of the active kinematic chain, taken in their actuation order, rotations around their rotational axes in order to approach the effector to its target position, wherein each rotation of a rotational joint about a rotational axis is bounded by one among the corresponding maximal rotation angle about the axis and of the corresponding maximal fractional rotation contribution about the axis to the target rotation which would minimize the distance between the effector and its target position, said iteratively applying resulting in the model simulating said human or animal body taking the target position.

2. The computer-implemented method of claim 1 further comprising the following step, carried out after step d):
   e) applying a cyclic coordinate descent algorithm to make the effector converge to the target position, unless convergence has already been achieved at the end of step d).

3. The computer-implemented method of claim 1 wherein each rotation of a rotational joint about a rotational axis is bounded by the largest among the corresponding maximal rotation angle about the axis and of the corresponding maximal fractional rotation contribution about the axis to the target rotation which would minimize the distance between the effector and its target position.

4. The computer-implemented method of claim 1 wherein in step d) at least one rotation is bounded by at least one constraint modeling a physiological constraint of the human or animal body.

5. The computer-implemented method of claim 1 wherein step c) comprises creating an ordered list of elements, each element of the list comprising at least:
- an identifier of a rotational joint and of a rotational axis thereof;
- a numerical value indicative of the corresponding maximal fractional rotation contribution about the axis to a target rotation; and
- a numerical value indicative of the corresponding maximal rotation angle about the axis.

6. The computer-implemented method of claim 1 wherein said target position is moving in a three-dimensional scene containing the model of said human or animal body, and wherein step d) is repeatedly carried out, in real time, for a plurality of successive locations of the target position.

7. The computer-implemented method of claim 1 further comprising displaying a graphical representation of said human or animal body.

8. The computer-implemented method of claim 1, wherein the effector corresponds to an element chosen among a hand, a finger, a foot, a toe, a head or a portion thereof of said human or animal body.

9. A computer program product, comprising:
a non-transitory computer-readable data-storage medium having computer-executable instructions stored thereon, the instructions causing a computer system to:
a) provide in computer memory a model of a human or animal body, including a skeleton comprising a plurality of bones articulated by rotational joints to form at least one kinematic chain, each rotational joint connecting two bones and having a number of rotational axes comprised between one and three;
b) define a starting position and a starting rotational state for each rotational joint of the skeleton, and a target position for a point, called effector, of a kinematic chain, called active kinematic chain;
c) for at least one rotational axis of each one of a plurality of rotational joints of the active kinematic chain, define:
an actuation order;
a maximal fractional rotation contribution about the axis to a target rotation; and
a maximal rotation angle about the axis; and
d) automatically iteratively apply, to the rotational joints of the active kinematic chain, taken in their actuation order, rotations around their rotational axes in order to approach the effector to its target position, wherein each rotation of a rotational joint about a rotational axis is bounded by one among the corresponding maximal rotation angle about the axis and of the corresponding maximal fractional rotation contribution about the axis to the target rotation which would minimize the distance between the effector and its target position, said iteratively applying resulting in the model simulating said human or animal body taking the target position.

10. A non-transitory computer-readable data-storage medium comprising:
a memory area containing computer-executable instructions that cause a computer system to:
a) provide in computer memory a model of a human or animal body, including a skeleton comprising a plurality of bones articulated by rotational joints to form at least one kinematic chain, each rotational joint connecting two bones and having a number of rotational axes comprised between one and three;
b) define a starting position and a starting rotational state for each rotational joint of the skeleton, and a target position for a point, called effector, of a kinematic chain, called active kinematic chain;
c) for at least one rotational axis of each one of a plurality of rotational joints of the active kinematic chain, define:
an actuation order;
a maximal fractional rotation contribution about the axis to a target rotation; and
a maximal rotation angle about the axis; and
d) automatically iteratively apply, to the rotational joints of the active kinematic chain, taken in their actuation order, rotations around their rotational axes in order to approach the effector to its target position, wherein each rotation of a rotational joint about a rotational axis is bounded by one among the corresponding maximal rotation angle about the axis and of the corresponding maximal fractional rotation contribution about the axis to the target rotation which would minimize the distance between the effector and its target position, said iteratively applying resulting in the model simulating said human or animal body taking the target position.

11. A computer system comprising:
a processor coupled to a memory and a graphical user interface;
the memory storing computer-executable instructions that cause the computer system to:
a) provide in computer memory a model of a human or animal body, including a skeleton comprising a plurality of bones articulated by rotational joints to form at least one kinematic chain, each rotational joint connecting two bones and having a number of rotational axes comprised between one and three;
b) define a starting position and a starting rotational state for each rotational joint of the skeleton, and a target position for a point, called effector, of a kinematic chain, called active kinematic chain;
c) for at least one rotational axis of each one of a plurality of rotational joints of the active kinematic chain, define:
an actuation order;
a maximal fractional rotation contribution about the axis to a target rotation; and
a maximal rotation angle about the axis; and
d) automatically iteratively apply, to the rotational joints of the active kinematic chain, taken in their actuation order, rotations around their rotational axes in order to approach the effector to its target position, wherein each rotation of a rotational joint about a rotational axis is bounded by one among the corresponding maximal rotation angle about the axis and of the corresponding maximal fractional rotation contribution about the axis to the target rotation which would minimize the distance between the effector and its target position, said iteratively applying resulting in the model simulating said human or animal body taking the target position.

12. A computer-based model of a human or animal body comprising:
a simulator coupled to a computer-implemented model of a human or animal body, the model of said human or animal body, including a skeleton comprising a plurality of bones articulated by rotational joints to form at least one kinematic chain, each rotational joint connecting two bones and having a number of rotational axes comprised between one and three, the simulator executable by a processor; and a posture simulating portion of the simulator causing the model to simulate the modeled human or animal body taking a posture of interest by:

defining a starting position and a starting rotational state for each rotational joint of the skeleton, and a target position for a point, called effector, of a kinematic chain, called active kinematic chain;

for at least one rotational axis of each one of a plurality of rotational joints of the active kinematic chain, defining:

an actuation order;

a maximal fractional rotation contribution about the axis to a target rotation; and a maximal rotation angle about the axis; and automatically iteratively applying, to the rotational joints of the active kinematic chain, taken in their actuation order, rotations around their rotational axes in order to approach the effector to its target position, wherein each rotation of a rotational joint about a rotational axis is bounded by one among the corresponding maximal rotation angle about the axis and of the corresponding maximal fractional rotation contribution about the axis to the target rotation which would minimize the distance between the effector and its target position, said iteratively applying resulting in the model simulating said modeled human or animal body taking the target position as the posture of interest.

* * * * *